G. STRANCE, R. S. BULL & W. P. NORRIS.
STUFFING BOX.
APPLICATION FILED JAN. 28, 1908.
933,400. Patented Sept. 7, 1909.
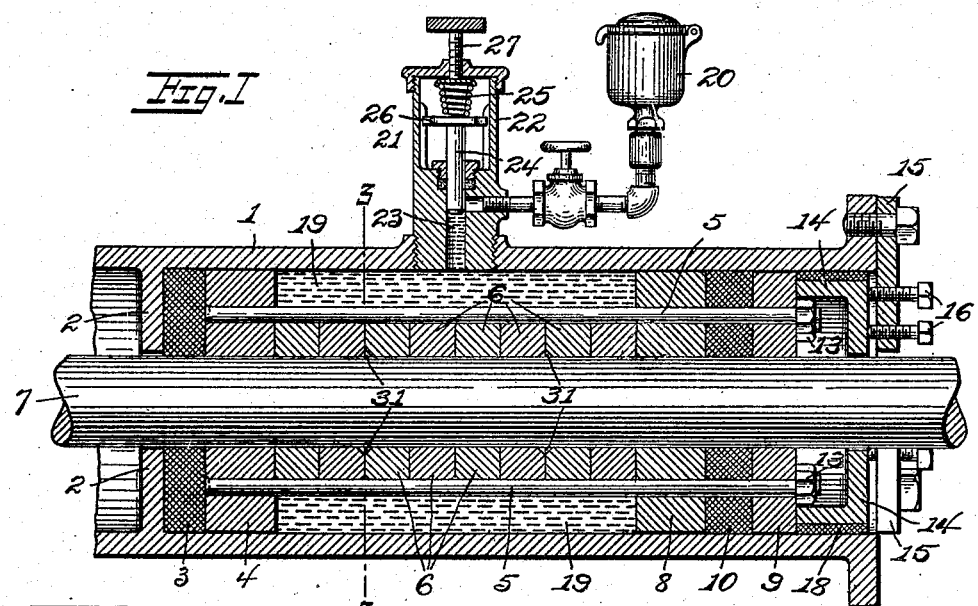
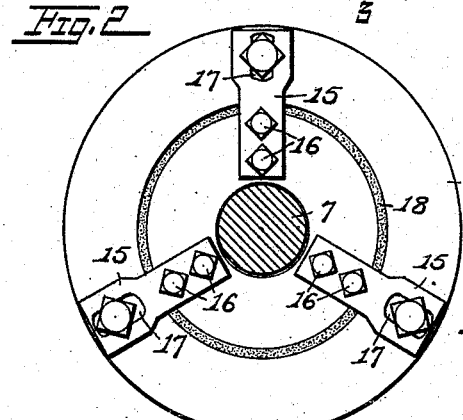
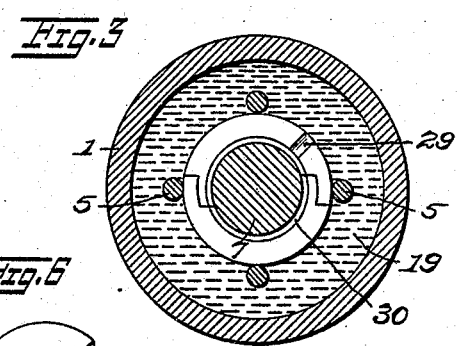
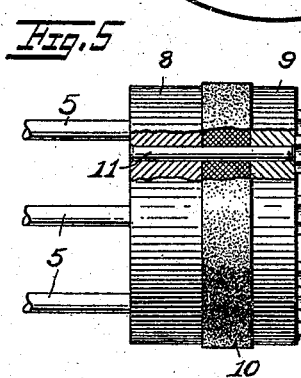
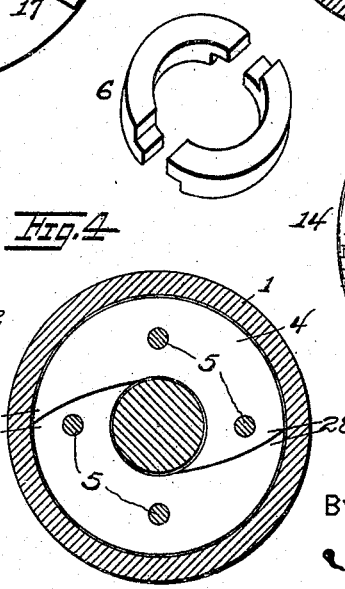
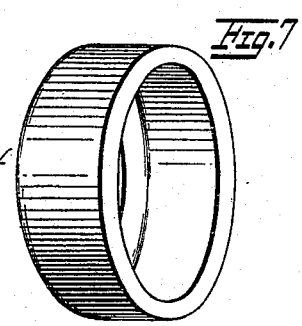
WITNESSES:
E. A. Jenkard
J. C. Gibson
INVENTORS
George Strance
Rees S. Bull
William P. Norris
BY
N. E. Dunlop
ATTORNEY

UNITED STATES PATENT OFFICE.

GEORGE STRANCE, REECE S. BULL, AND WILLIAM P. NORRIS, OF SISTERSVILLE, WEST VIRGINIA.

STUFFING-BOX.

933,400.  Specification of Letters Patent.  Patented Sept. 7, 1909.

Application filed January 28, 1908. Serial No. 413,061.

*To all whom it may concern:*

Be it known that we, GEORGE STRANCE, REECE S. BULL, and WILLIAM P. NORRIS, citizens of the United States of America, and residents of Sistersville, county of Tyler, and State of West Virginia, have invented certain new and useful Improvements in Stuffing-Boxes, of which the following is a specification.

This invention relates to improvements in packings for stuffing-boxes, and it has for its primary object to provide a simple and efficient metallic packing which may be readily adjusted at any time to compensate for wear, and to exert any desired pressure upon the plunger or piston, and which is further self-adjusting with relation to said plunger or piston inasmuch as it readily adapts itself to inequalities in said plunger or piston.

A further object is to provide a stuffing-box which will readily admit of a limited movement or lateral play of the plunger or piston.

With these and other objects in view, all of which will hereinafter be made apparent, the invention finally consists in the particular construction, arrangement and combination of parts which will hereinafter be fully described, reference being had to the accompanying drawings, forming a part of this specification, in which—

Figure 1 is a longitudinal section of the invention; Fig. 2 is an end view of the same; Fig. 3 is a cross section on the line 3—3, Fig. 1; Fig. 4 is a similar view on the line 4—4, Fig. 1; Fig. 5 is a detail view, partially broken, of the outer end of the cage; Fig. 6 is a detail perspective view of a segmental ring; and Fig. 7 is a similar view of the compression cap.

Referring to the drawings, in which like designating characters distinguish like parts throughout the several views—1 indicates the body of the stuffing-box which has integral therewith at its inner end the usual internal annular shoulder or abutment 2. Against this shoulder or abutment within the stuffing-box is seated a close-fitting gasket 3 of rubber or other appropriate material which is adapted to be compressed to prevent leakage thereby. Fitted within the stuffing-box with its end against said gasket 3 is a cage comprising a metal collar 4, a plurality of spaced parallel rods 5 rigidly carried by said plate at points equidistant from its center. Mounted within said cage and held against displacement by said rods 5 is a plurality of metallic packing rings 6 composed of segmental sections 6$^a$ fitted to bear against the circumferential surface of a plunger 7 working through said stuffing-box. Movably mounted upon said rods 5 are two metal collars 8 and 9, the inner of which fits against the outermost of said packing rings, said collars 8 and 9 having interposed between them a gasket 10 of rubber or other compressible elastic packing material. Bolts 11 carried by said collar 8 and projecting outward through the collar 9 have nuts 12 threaded thereon whereby the compression of said rubber ring or gasket 10 is effected to cause its circumferential surface to fit closely against the walls of the stuffing-box. The outer ends of the rods 5 are threaded and nuts 13 are carried thereby whereby pressure is brought to bear upon said packing rings 6.

In assembling the device, the parts composing the cage are fitted together and are properly adjusted before inserting the same within the stuffing-box; after such insertion, a cup-shaped compression cap 14 is fitted over the plunger or rod within the edge of its annular rim against said collar 9. Radial lugs 15 bolted to the head of the stuffing-box have set-screws 16 projecting therethrough against said cap for effecting the compression of the gasket 3 and for compressing the metallic packing rings 6 in a direction in alinement with the plunger. The said lugs are each provided with longitudinal slots 17 for admitting of a slight adjustment of said lugs in a radial direction. As is obvious, an ordinary form of gland might be substituted for said lugs, said gland being bolted to the stuffing-box in the usual manner. A gasket 18 may be employed about said cap 14 if desired.

For compressing the metallic packing rings against the plunger, the space or chamber 19 between said rings and the body 1 of the stuffing-box is preferably filled with a lubricating fluid, although water, steam or any other appropriate compressible material may be employed in place of said lubricating fluid. Said chamber is supplied through a suitable reservoir 20 having communication therewith, and a compression device 21 is provided whereby the pressure of said fluid against said metallic packing rings may be regulated. Said compression device may be of any appropriate character, but preferably consists of a body 22 mounted upon the stuffing-box and having a channel 23 therein through which said fluid enters the stuffing-box, a piston 24 adjustably mounted for effecting displacement of the fluid and causing the latter to exert pressure against said packing rings. For automatically relieving said pressure when said fluid expands, a spring 25 is preferably interposed between the head 26 of the piston 24 and the end of the adjusting-screw 27.

Each of the collars 4, 8 and 9 is preferably segmental in form and have interfitting ends 28.

The segments of the metallic packing rings preferably have their ends mortised, substantially as shown; and, for the purpose of allowing the lubricating fluid to reach the plunger, two adjacent rings, located at intervals, each have registering radial grooves 29 in their adjacent faces, and their adjacent inner edges are beveled as shown at 30, to form a circular channel 31 for carrying the fluid.

Having thus described our invention, what we claim as new and desire to secure by Letters Patent, is—

1. A stuffing-box comprising a hollow body having an internal annular shoulder at its inner end, a compressible gasket fitted against said shoulder, a plunger-collar fitted against said gasket, a plurality of longitudinal parallel rods carried by said collar, a second collar longitudinally movable upon said rods, a plurality of segmental rings interposed between said collars within the confines of said rods, means whereby said movable collar is caused to compress said rings in a direction in alinement with the plunger, means whereby said gasket is compressed and means independent of said hollow body for compressing said rings against said plunger.

2. A stuffing-box comprising a hollow body having an abutment at its inner end, a compressible gasket fitted against said abutment, a plunger-collar fitted against said gasket, a plurality of longitudinal parallel rods carried by said plunger-collar, a pair of movable collars mounted upon said rods adjacent to their free ends, a gasket interposed between said movable collars, means for compressing the last-mentioned gasket, a plurality of segmental rings interposed between said plunger-collar and the inner collar comprising the pair, nuts carried by the outer ends of said rods whereby said rings are compressed in line with the plunger, means whereby the compression of the first-mentioned gasket is effected, radial lugs carried by the head of said body, and set-screws projected through said lugs for effecting the compression of the rings, and means for compressing said rings in a direction at right angles to said plunger.

3. A stuffing-box comprising a hollow body having an internal annular shoulder at its inner end; a cage within said body; said cage consisting of a plunger-collar, a plurality of longitudinal spaced parallel rods having their inner ends fixed to said plunger-collar, and a collar carried by the outer ends of said rods, the last-mentioned collar being longitudinally movable along said rods; a plurality of segmental rings mounted within said cage; means for forcing said movable collar inward along said rods for compressing said rings; means for forcing the inner end of said cage inward with the plunger-collar against said shoulder; and means independent of said hollow body for compressing said rings against the plunger.

4. A stuffing-box comprising a hollow body having an internal annular shoulder at its inner end; a cage within said body; said cage consisting of a plunger-collar, a plurality of longitudinal spaced parallel rods having their inner ends fixed to said plunger-collar, and a collar carried by the outer ends of said rods, the last-mentioned collar being longitudinally movable along said rods; a plurality of segmental rings mounted within said cage; means for forcing said movable collar inward along said rods for compressing said rings; a gasket interposed between said cage and said shoulder; means whereby said cage is forced inward to compress said gasket; and means independent of said hollow body for compressing the ring-segments against the plunger.

5. A stuffing-box comprising a hollow body having an internal annular shoulder at its inner end; a cage within said body; said cage consisting of a plunger-collar, a plurality of longitudinal spaced parallel rods having their inner ends fixed to said shaft-collar, and a collar carried by the outer ends of said rods, the last-mentioned collar being longitudinally movable along said rods; a plurality of segmental rings mounted within said cage in engagement with the plunger, a gasket on said rods against the outer face of said movable collar; means independent of the hollow body for compressing the last-mentioned gasket; and means associated with said body whereby said cage is caused to effect the compression of the first-mentioned gasket, and means independent of said hollow body for compressing the ring-segments against the plunger.

6. A stuffing-box comprising a hollow body having an internal annular shoulder at its inner end; a cage within said body; said cage consisting of a plunger-collar, a plurality of longitudinal spaced parallel rods having their inner ends fixed to said plunger-collar, and a collar carried by the outer ends of said rods, the last-mentioned collar being longitudinally movable along said rods; a plurality of segmental rings mounted within said cage in engagement with the plunger; a gasket on said rods against the outer face of said movable collar; means independent of the hollow body for compressing the last-mentioned gasket; means whereby said movable collar, gasket and means are moved inward along said rods to effect the compression of said rings in a direction in alinement with the plunger; means associated with the outer end of said body whereby said cage is caused to effect the compression of the first-mentioned gasket; and means for compressing said ring-segments against the plunger.

7. A stuffing-box comprising a hollow body having an internal annular shoulder at its inner end; a cage within said body; said cage consisting of a plunger-collar, a plurality of longitudinal spaced parallel rods having their inner ends fixed to said shaft-collar, and a collar carried by the outer ends of said rods, the last-mentioned collar being longitudinally movable along said rods; a plurality of segmental rings mounted within said cage in engagement with the plunger; a gasket on said rods against the outer face of said movable collar; means independent of the hollow body for compressing the last-mentioned gasket; means whereby said movable collar, gasket and means are moved inward along said rods to effect the compression of said rings in a direction in alinement with the plunger; means associated with the outer end of said body whereby said cage is caused to effect the compression of the first-mentioned gasket; means for compressing said ring-segments against the plunger; and adjustable fluid-compression means for causing said ring-segments to closely embrace the plunger.

In testimony whereof we affix our signatures in presence of witnesses.

GEORGE STRANCE.
REECE S. BULL.
WILLIAM P. NORRIS.

Witnesses:
J. H. MARSHALL,
S. THISTLE,
G. L. LOETHER.